United States Patent
Jacobs

[15] 3,698,462
[45] Oct. 17, 1972

[54] PNEUMATIC TIRE
[72] Inventor: Paul F. Jacobs, Copley, Ohio
[73] Assignee: The Goodyear Tire & Rubber Company, Akron, Ohio
[22] Filed: Jan. 27, 1971
[21] Appl. No.: 110,086

[52] U.S. Cl. ................................................152/209
[51] Int. Cl. ..............................................B60c 11/06
[58] Field of Search....................................152/209

[56] References Cited
UNITED STATES PATENTS 3,384,144   5/1968   Tiborcz ......................152/209
2,164,819   7/1939   Hick et al. ..................152/209
3,498,354   3/1970   Boileau........................152/209

Primary Examiner—James B. Marbert
Attorney—F. W. Brunner and Michael L. Gill

[57] ABSTRACT

A pneumatic tire having a plurality of circumferentially extending ribs with circumferentially extending grooves separating each pair of ribs. Alternate circumferentially extending grooves extend radially inwardly for only about one-half the depth of the non-skid portion and each has circumferentially extending and circumferentially spaced apart slots in its base which extend for the remainder of the depth of the non-skid portion.

18 Claims, 6 Drawing Figures

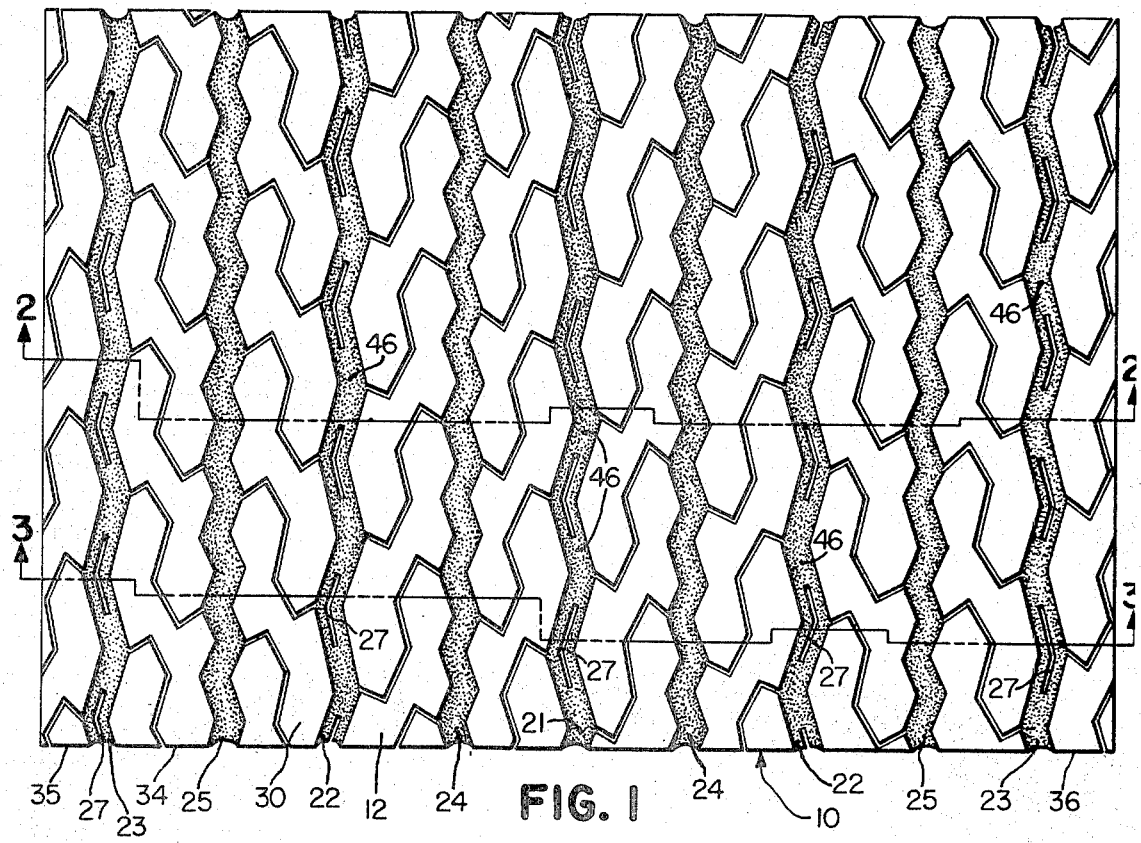
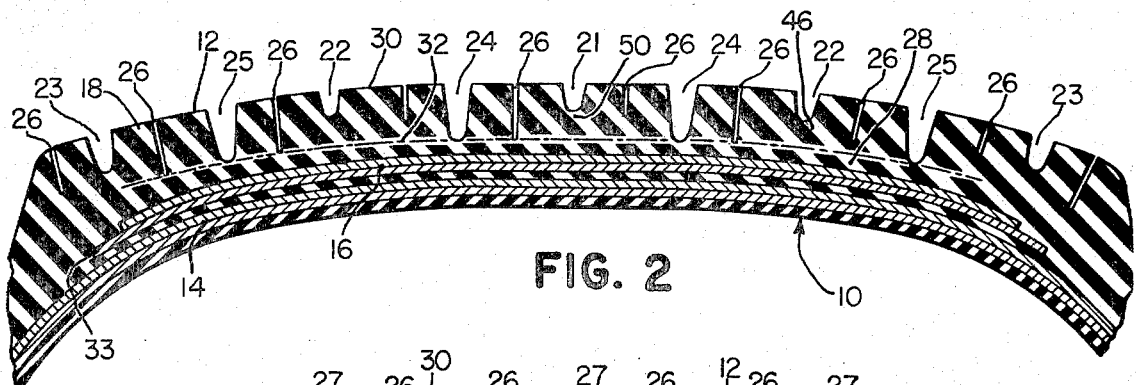
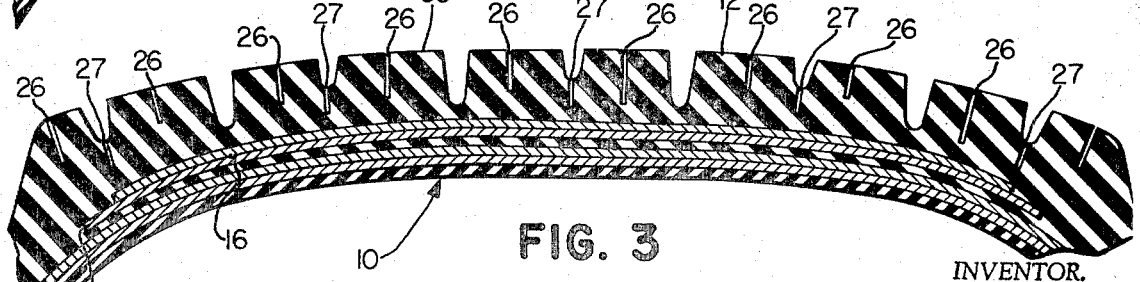
PATENTED OCT 17 1972 3,698,462
SHEET 1 OF 2
FIG. 1
FIG. 2
FIG. 3
INVENTOR.
PAUL F. JACOBS
BY Michael L. Gill
ATTORNEY

INVENTOR.
PAUL F. JACOBS

PNEUMATIC TIRE

The foregoing abstract is not to be taken as limiting the invention of this application, and in order to understand the full nature and extent of the technical disclosure of this application, reference must be made to the accompanying drawings and the following detailed description.

This invention relates to pneumatic tires, and more particularly to the non-skid or tread portion of a pneumatic tire.

Grooves in the tread of a tire which stay open in the footprint of the tire during the normal operation of the tire on a vehicle serve, among other things, the purpose of conducting water out of the footprint area and preventing hydroplaning. It, therefore, follows that an increased number of these grooves in the tread portion will improve the tires resistance to hydroplaning. The number of grooves, however, which may be placed in the tread portion of the tire is limited by the area of the tread and the necessity to maintain the structural strength and rigidity of the tread portion. If the tread portion has numerous grooves in it, the ribs between the grooves will necessarily be very narrow and lack the desired structural strength and rigidity. The present invention provides an increased number of grooves in the tread portion but maintains the structural integrity of the tread portion by providing that alternate grooves extend for only part of the depth of the non-skid portion, thereby structurally connecting adjacent ribs together in pairs for improved strength. The skid resistance and appearance of the partially worn tire is maintained by providing a series of slots in the base of the part depth groove such that when the part depth grooves are worn away the slots will appear in the tread pattern and maintain good skid resistance.

It is an object of this invention to provide a pneumatic tire with a tread portion having improved skid resistance and structural strength and at the same time maintain good skid resistance when the tire is partly worn.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the drawings:

FIG. 1 is a fragmentary plan view of a portion of the tread of a tire constructed in accordance with this invention;

FIG. 2 is a sectional view of the tire in FIG. 1 taken substantially along line 2—2 of FIG. 1;

FIG. 3 is a sectional view of the tire of FIG. 1 taken substantially along line 3—3 of FIG. 1;

Figure 4:
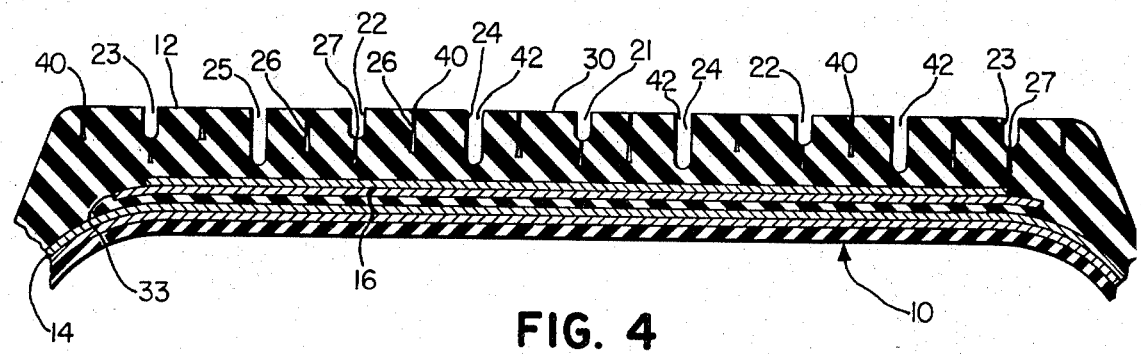
FIG. 4 is a view similar to that of FIG. 3, but illustrating the tire in an inflated and loaded condition.

With reference to the drawings and in particular FIGS. 1 and 2, there is illustrated to a tire 10 constructed in accordance with this invention. The tire 10 comprises a tread portion which extends circumferentially thereabout and a cord reinforced carcass 14. The particular tire illustrated also includes a pair of belt or breaker plies 16 disposed between the carcass 14 and the tread 12. The tread 12 includes a non-skid portion 18 having a plurality of recesses 21 through 27 forming a portion of the tread pattern. As is the usual practice in the design of the non-skid portion of a tire, the depth of the recesses is limited by a predetermined radial space or undertread 28 extending radially outwardly from the outermost reinforcing ply, which in the particular embodiment illustrated, is the radially outer ply of the belt 16. For purposes of this invention, the base or bottom 32 of the non-skid portion 18 shall be construed to coincide with the maximum depth to which the recesses 21 through 27 may extend. The non-skid portion of the tire shall be that portion of the tread 12 located between the ground contacting surface 30 and the base 32.

More particularly and with reference to FIGS. 1, 2 and 3, a tire 10 constructed in accordance with this invention comprises a plurality of main ribs 34 and a pair of shoulder ribs 35 and 36 located at the lateral edges of the tread portion 12. The ribs 34, 35 and 36 are generally parallel and extend circumferentially about the tire. Each two adjacent ribs of the ribs 34, 35 and 36 are separated by a circumferentially extending groove 21, 22, 23, 24 or 25. The grooves 21, 22 and 23 extend only part of the distance from the tread surface 30 to the base 32, while the grooves 24 and 25 extend substantially to the base 32. Each pair of part depth grooves 21, 22, 23 has a full depth groove 24 or 25 disposed therebetween. In other words, progressing laterally across the tread portion the grooves alternately extend only part of the distance to the base 32 of the non-skid. In the particular embodiment illustrated, the lateral edges 33 of the belt ply 16 are located radially inwardly of the partial depth grooves 23 located near the lateral edge of the tread.

Each rib 34, 35 and 36 is provided with a pattern of narrow slots or slits 26 extending from the outer surface 30 of the tread 12 for varying depths of the non-skid portion 18. The slots 26 are narrow as compared to the grooves 21 through 25 and perform a different function. Slots or slits 26 are known to those skilled in the art as narrow voids in the tread similar to sipes and serve to break up the tread pattern and provide edges or corners to resist skidding. These slots are very minor in width and close up at the ground contacting surface 30 in the footprint area of the tire when the tire is inflated to normal inflation pressure and loaded to design load, as illustrated in FIG. 4 at 40. These slots are in contrast with grooves which are major recesses in the tread and are much wider. Grooves serve the additional function of channeling water and other liquids out of the footprint area and stay open at the ground contacting surface 30 in the footprint area when the tire is inflated to design inflation pressure and loaded to design load, as illustrated in FIG. 4 at 42. For purposes of this invention, therefore, a slot is distinguished from a groove in that a slot is relatively narrow and closes up at the ground contacting surface 30 in the footprint area in the normal operation of the tire on a vehicle while a groove is relatively wide and remains open at the ground contacting surface in the footprint of the tire during the normal operation of the tire on a vehicle.

As best seen in FIGS. 1 and 3, a plurality of recesses or slots 27 are provided in the base of each partial depth groove 21, 22 and 23 and extends substantially for the rest of the depth of the non-skid portion 18. Each slot 27 is substantially narrower than its respective groove 21, 22 or 23 and extends longitudinally with respect thereto along the longitudinal centerline thereof. The recesses or slots 27 are narrow, and as described above with regard to the slots 26, will, when the tread portion is worn to the point at which the ground contacting surface 30 coincides with the outer end of the slot 27, close up in the footprint area in the normal operation of the tire on a vehicle. The slots 27 are spaced apart in longitudinal directions along their respective groove 21, 22, 23 a predetermined amount, which in the particular embodiment illustrated is substantially equal to the length of each slot 27 along the respective groove 21, 22, 23. Adjacent ribs on opposite sides of each part depth groove 21, 22 and 23 are therefore structurally united by the rubber or tie bar 46 located between adjacent slots 27.

The particular embodiment illustrated is a tire of size H75-15 having a bias carcass and a belt structure. The laterally innermost full depth grooves 24 are approximately .40 inch deep, while the laterally outermost full depth grooves 25 are approximately .44 inch deep. The laterally innermost part depth grooves 21 and 22 are approximately .21 inch deep while the grooves 23 near the shoulder are approximately .23 inch deep. The primary or full depth grooves 24 and 25 are approximately .12 inch wide at the ground contacting surface in the molded configuration while the part depth grooves 21, 22 and 23 are approximately .10 inch wide in the molded configuration at the ground contacting surface. The discontinuous recesses or slots 27 are about .02 inch wide and have an actual length of about .70 inch. The distance along the base of the grooves 21, 22 and 23 between adjacent slots 27 is approximately .70 inch. The specific embodiment illustrated is, for purposes of example only, and one skilled in the art will readily appreciate that the slots 27 could be longer or shorter and at the tie bar or bridging portion 46 between the slots 27, can be longer or shorter. Preferably, however, the slots should be no more than three inches long, and the tie bar 46 or space between adjacent slots 27 should be approximately equal to the length of the respective slots 27. Further, while the partial depth grooves 21, 22 and 23 are illustrated as extending about one-half the distance from the ground contacting surface 30 to the base 32 they may extend to a different depth of between 30 and 70 percent of the distance from the tread surface 30 to the base 32.

As illustrated in FIG. 4, when the tire 10 is inflated to design inflation pressure and loaded to design load, the grooves 21, 22, 23, 24, 25 remain substantially open at the ground contacting surface in the footprint. Of particular interest are the laterally outermost grooves 23 located adjacent the shoulder areas which would normally have a greater tendency to close up, particularly when the tread portion is subjected to tangential stresses such as in cornering. It is the intent, however, that the grooves remain open, and in the invention as illustrated these laterally outer grooves 23 are only part depth grooves and, therefore, have increased resistance to closing up. Further, since these grooves 23 do not extend to the full depth of the non-skid and the thickness of rubber between the bottom of the groove and the plies is greater than that below full depth grooves, this lateral portion of the tread has less a tendency to flex which will tend to increase belt edge separation resistance.

Figure 5:
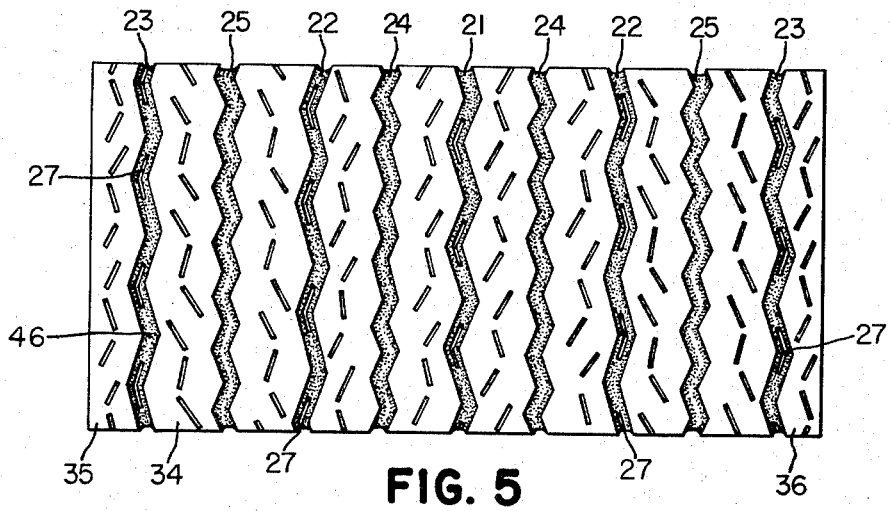
FIG. 5 is a view of the tire of FIG. 1 similar to that in FIG. 1 but with the tread portion about 25 percent worn.
Figure 6:
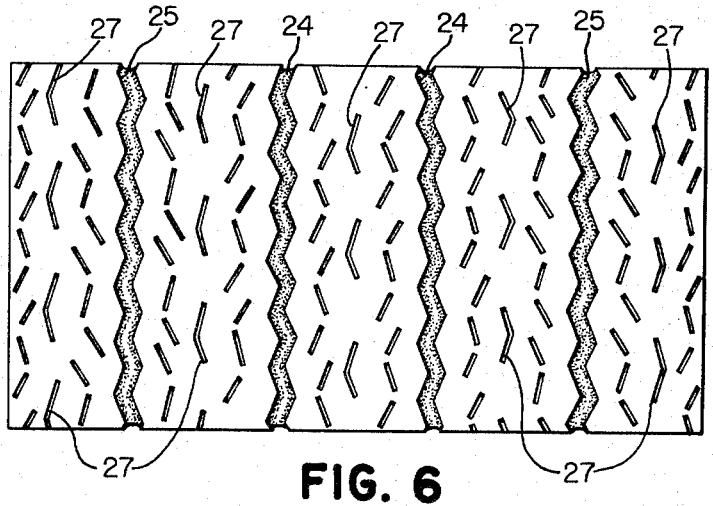
FIG. 6 is a view of the tire in FIG. 1 similar to that in FIG. 1 but with the tread portion about 50 percent worn.

As illustrated in FIG. 5, the tire 10, when 25 percent worn, will still have both full depth grooves 24 and 25 and partial depth grooves 21, 22 and 23 in the tread pattern, but portions of slots 26, which were shallow, will disappear. When the tire is fifty percent worn, as illustrated in FIG. 6, the half depth grooves 21, 22 and 23 are gone; however, there is still sufficient tread pattern to provide skid resistance and pleasing appearance since the full depth grooves 24, 25 and slots 26 and 27 remain.

As noted above, it is also an advantage of this invention to provide an increased number of circumferentially extending grooves to conduct water out of the footprint while at the same time maintaining the same structural strength and rigidity of the tread. With reference to FIG. 2, it can be observed that there are in the particular embodiment illustrated 9 grooves 21, 22, 23, 24 and 25, and if all these grooves extended to the full depth of the non-skid portion, the ribs 34 would be very narrow and lack the desired rigidity and strength. However, with the present invention the ribs 34, 35 and 36 are connected in pairs by the portion of rubber or tie bar 46 between the slots 27 and beneath the base of the partial depth grooves 21, 22 and 23. The worn tire, however, still has good skid resistance since the base of the partial depth grooves 21, 22 and 23 are provided with circumferentially extending slots 27.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a non-skid portion extending circumferentially thereabout, said non-skid portion including ribs extending circumferentially about said tire and grooves disposed between each pair of said ribs and extending circumferentially about said tire and having a ground contacting surface and base, the improvement wherein a first plurality of said grooves extends radially inwardly from the ground contacting surface of the non-skid portion only part of the distance to the base of the non-skid portion and are provided with a plurality of recesses in the base thereof said recesses being spaced apart longitudinally of said first set of grooves a distance about equal to the length of adjacent recesses.

2. A tire as claimed in claim 1 wherein said recesses are slots extending longitudinally of the respective groove.

3. A tire as claimed in claim 2 wherein said slots extend radially inwardly of the tire substantially to the base of said non-skid portion.

4. A tire as claimed in claim 2 wherein each groove of the first plurality of grooves extends to between 30 and 70 percent of the distance from the ground contacting surface of the non-skid portion to the base of the nonaskid portion.

5. A tire as claimed in claim 4 wherein said slots extend radially inwardly of the tire substantially to the base of the non-skid portion.

6. A tire as claimed in claim 1 including a shoulder rib at each lateral edge of said non-skid portion and in which each circumferential rib other than each said shoulder rib is bounded on one side by a circumferential groove which extends for substantially the full depth of the non-skid portion and on the opposite side by a groove of said first plurality of grooves.

7. A tire as claimed in claim 6 in which said recesses are slots extending longitudinally of their respective groove.

8. A tire as claimed in claim 7 in which each said slot extends radially inwardly of the tire substantially to the base of said non-skid portion.

9. A tire as claimed in claim 6 in which the two laterally outermost circumferential grooves extend approximately one-half the depth of the non-skid portion.

10. A tire as claimed in claim 8 in which the two laterally outermost circumferential grooves extend approximately one-half the depth of the non-skid portion.

11. A tire as claimed in claim 10 in which said slots extend along the longitudinal centerline of their respective groove.

12. A pneumatic tire having a non-skid portion extending circumferentially thereabout, said non-skid portion including ribs extending circumferentially about said tire and grooves disposed between each pair of said ribs and extending circumferentially about said tire and having a ground contacting surface and base, the improvement wherein a first plurality of said grooves extends radially inwardly from the ground contacting surface of the non-skid portion to between 30 and 70 percent of the distance to the base of the non-skid portion and are provided with a plurality of recesses in the base thereof said recesses being spaced apart longitudinally of said first set of grooves.

13. A tire as claimed in claim 12 wherein said recesses are slots extending longitudinally of the respective groove.

14. A tire as claimed in claim 13 wherein said slots extend radially inwardly of the tire substantially to the base of said non-skid portion.

15. A tire as claimed in claim 12 including a shoulder rib at each lateral edge of said non-skid portion and in which each circumferential rib other than each said shoulder rib is bounded on one side by a circumferential groove which extends for substantially the full depth of the non-skid portion and on the opposite side by a groove of said first plurality of grooves.

16. A tire as claimed in claim 15 in which said recesses are slots extending longitudinally of their respective groove.

17. A tire as claimed in claim 16 in which each said slot extends radially inwardly of the tire substantially to the base of said non-skid portion.

18. A tire as claimed in claim 17 in which the length of each said slot along the base of its respective groove is approximately equal to the distance between adjacent slots in said respective groove as measured along the centerline of said respective groove.

* * * * *